(12) United States Patent
Enomoto et al.

(10) Patent No.: US 11,293,164 B2
(45) Date of Patent: Apr. 5, 2022

(54) WHEEL LOADER AND METHOD FOR CONTROLLING WHEEL LOADER

(71) Applicant: KOMATSU LTD., Tokyo (JP)

(72) Inventors: Ryota Enomoto, Tokyo (JP); Masanori Ikari, Tokyo (JP); Kentaro Yajima, Tokyo (JP); Takuma Nishimura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 462 days.

(21) Appl. No.: 16/087,782

(22) PCT Filed: Aug. 10, 2017

(86) PCT No.: PCT/JP2017/029103
§ 371 (c)(1),
(2) Date: Sep. 24, 2018

(87) PCT Pub. No.: WO2018/037936
PCT Pub. Date: Mar. 1, 2018

(65) Prior Publication Data
US 2020/0299923 A1  Sep. 24, 2020

(30) Foreign Application Priority Data
Aug. 26, 2016 (JP) .............................. JP2016-165742

(51) Int. Cl.
*E02F 3/43* (2006.01)
*E02F 3/28* (2006.01)
(Continued)

(52) U.S. Cl.
CPC .............. *E02F 3/431* (2013.01); *E02F 3/283* (2013.01); *E02F 3/422* (2013.01); *E02F 9/2004* (2013.01); *E02F 9/24* (2013.01); *E02F 9/26* (2013.01); *F16D 25/00* (2013.01); *F16D 48/02* (2013.01); *B65G 67/04* (2013.01)

(58) Field of Classification Search
CPC . E02F 3/431; E02F 3/283; E02F 3/422; E02F 9/2004; E02F 9/24; E02F 9/26; F16D 25/00; F16D 48/02; B65G 67/04
See application file for complete search history.

(56) References Cited

U.S. PATENT DOCUMENTS

| 6,162,146 A | 12/2000 | Hoefling |
| 8,504,257 B2 | 8/2013 | Yamaguchi et al. |

(Continued)

FOREIGN PATENT DOCUMENTS

| CN | 101821457 A | 9/2010 |
| CN | 102037194 A | 4/2011 |

(Continued)

*Primary Examiner* — James M McPherson
*Assistant Examiner* — Kyle J Kingsland
(74) *Attorney, Agent, or Firm* — Faegre Drinker Biddle & Reath LLP

(57) ABSTRACT

A wheel loader includes a boom, a forward clutch, and a controller configured to control hydraulic pressure of hydraulic oil supplied to the forward clutch. The controller performs clutch hydraulic pressure control for bringing the forward clutch into a semi-engagement state by controlling the hydraulic pressure of the hydraulic oil supplied to the forward clutch on condition that the wheel loader advances while raising the boom in at least a loaded state.

9 Claims, 9 Drawing Sheets

(51) Int. Cl.
*E02F 3/42* (2006.01)
*E02F 9/20* (2006.01)
*E02F 9/24* (2006.01)
*E02F 9/26* (2006.01)
*F16D 25/00* (2006.01)
*F16D 48/02* (2006.01)
*B65G 67/04* (2006.01)

(56) References Cited

U.S. PATENT DOCUMENTS

| | | |
|---|---|---|
| 2010/0131158 A1 | 5/2010 | Saito |
| 2010/0145564 A1 | 6/2010 | Saito |
| 2010/0332061 A1 | 12/2010 | Forslöw et al. |
| 2011/0004378 A1 | 1/2011 | Saito |
| 2011/0040459 A1 | 2/2011 | Takiguchi et al. |
| 2011/0318156 A1 | 12/2011 | Saito et al. |
| 2012/0296531 A1 | 11/2012 | Hyodo et al. |
| 2016/0024755 A1* | 1/2016 | Kobiki ............... E02F 3/34 477/52 |
| 2016/0041066 A1 | 2/2016 | Patenaude et al. |
| 2016/0083931 A1 | 3/2016 | Monden et al. |
| 2016/0230369 A1 | 8/2016 | Kaneko et al. |

FOREIGN PATENT DOCUMENTS

| | | | |
|---|---|---|---|
| CN | 102414374 A | 4/2012 | |
| CN | 105102256 A | 11/2015 | |
| JP | H11-181841 A | 7/1999 | |
| JP | 2003-002258 A | 1/2003 | |
| JP | 2003-166634 A | 6/2003 | |
| JP | 2008-248523 A | 10/2008 | |
| JP | 2017178142 A * | 10/2017 | ............ F16D 48/02 |
| WO | WO 2009/011248 A1 | 1/2009 | |
| WO | WO-2009/019974 A1 | 2/2009 | |
| WO | WO-2009/116248 A1 | 9/2009 | |
| WO | WO-2010/104138 A1 | 9/2010 | |
| WO | WO-2011/074583 A1 | 6/2011 | |
| WO | WO-2011/099568 A1 | 8/2011 | |

\* cited by examiner

WHEEL LOADER AND METHOD FOR CONTROLLING WHEEL LOADER

TECHNICAL FIELD

The present invention relates to a wheel loader and a method for controlling the wheel loader.

BACKGROUND ART

A wheel loader that is a self-propelled work vehicle includes a traveling apparatus that causes a vehicle to travel and a work implement that performs various operations such as excavation. The traveling apparatus and the work implement are driven by a driving force from an engine.

An operator of the wheel loader simultaneously operates an accelerator pedal and a boom lever at the same time when soil scooped by a bucket of the work implement is loaded on a cargo box of a dump truck. Consequently, the wheel loader advances and performs boom raising. A loading operation is also referred to as "dump approach".

In the loading operation, when a distance between the wheel loader and the dump truck is insufficient, the wheel loader may arrive in front of the dump truck before the bucket is raised higher than the cargo box of the dump truck. For this reason, the operator adjusts a time until the wheel loader arrives near the dump truck by operating not only the accelerator pedal but also the brake pedal in consideration of time necessary for the raising of the boom.

WO 2009/116248 (PTL 1) discloses a work vehicle including a modulation clutch connected to a distributor that distributes output from the engine into a traveling system and a hydraulic device system. When the loading operation is detected, the work vehicle performs control for reducing hydraulic pressure of the modulation clutch. In particular, the work vehicle controls the hydraulic pressure of the modulation clutch according to an operation amount of the boom lever and an operation amount of the accelerator when the loading operation is detected.

U.S. Pat. No. 6,162,146 (PTL 2) discloses a technique relating to a drive train (powertrain) of the work vehicle such as the wheel loader. The work vehicle of U.S. Pat. No. 6,162,146 has a pressable right pedal that selectively controls torque associated with the powertrain. The work vehicle controls pressure of a selected direction switching clutch according to a pressing amount (position) of the right pedal.

CITATION LIST

Patent Literature

PTL 1: WO 2009/116248
PTL 2: U.S. Pat. No. 6,162,146

SUMMARY OF INVENTION

Technical Problem

Installation of the modulation clutch disclosed in PTL 1 and the right pedal disclosed in PTL 2 require cost and space. In the case where the distance between the wheel loader and the dump truck is insufficient in the above loading operation (dump approach), it is necessary to simultaneously operate the accelerator pedal and the brake pedal, and the operation becomes complicated for the operator. Additionally, the simultaneous operation of the accelerator pedal and the brake pedal leads to an increase in wear amount of a brake component (typically, a brake pad) and reduction of fuel consumption.

Consequently, when the increase in wear amount of the brake part and the reduction of the fuel consumption are prevented while the wheel loader advances while raising the boom in the loaded state, operation efficiency can be improved without increasing cost necessary for installation of hardware. When the simultaneous operation of the two pedals is eliminated while the wheel loader advances, the operation can be simplified to improve the operation efficiency.

The present disclosure has been made in view of the above problems, and an object of the present disclosure is to provide a wheel loader that can improve the operation efficiency when the wheel loader advances while raising a boom in a loaded state and a method of controlling the wheel loader.

Solution to Problem

According to an aspect of the present disclosure, a wheel loader includes a boom, a forward or speed stage clutch, and a controller configured to control hydraulic pressure of hydraulic oil supplied to the clutch. The controller performs clutch hydraulic pressure control for bringing the clutch into a semi-engagement state by controlling the hydraulic pressure of the hydraulic oil supplied to the clutch on condition that the wheel loader advances while raising the boom in at least a loaded state.

Advantageous Effect of Invention

According to the present disclosure, the operation efficiency can be improved when the wheel loader advances and approaches the dump truck.

DESCRIPTION OF EMBODIMENTS

Hereinafter, an embodiment will be described with reference to the drawings. It is planned from the beginning that structures in the embodiment are used while combined as appropriate. Some components may not be used.

A wheel loader will be described below with reference to the drawings. In the following description, "upper", "lower", "front", "rear", "left" and "right" are terms based on an operator seated in a driver's seat.

A. ENTIRE CONFIGURATION

Figure 1:
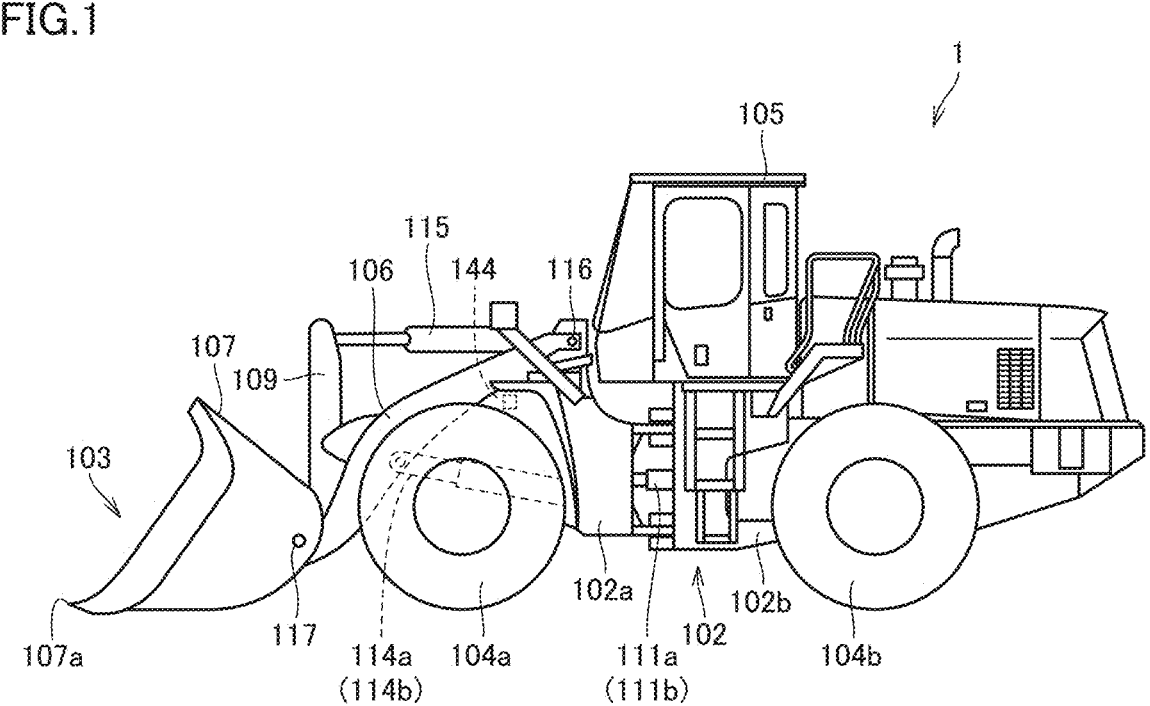
FIG. 1 is an external view of a wheel loader.

FIG. 1 is an external view of a wheel loader 1 according to an embodiment. As illustrated in FIG. 1, wheel loader 1 includes a vehicular body 102, a work implement 103, wheels 104*a*, 104*b*, and an operator's cab 105. Wheel loader 1 can be self-propelled by rotationally driving wheels 104*a*, 104*b*, and can perform desired operation using work implement 103.

Vehicular body 102 includes a front vehicular body unit 102*a* and a rear vehicular body unit 102*b*. Front vehicular body unit 102*a* and rear vehicular body unit 102*b* are connected to each other so as to be able to swing in left and right directions.

A pair of steering cylinders 111*a*, 111*b* are provided across front vehicular body unit 102*a* and rear vehicular body unit 102*b*. Steering cylinders 111*a*, 111*b* are hydraulic cylinders driven by hydraulic oil from a steering pump (not illustrated). Steering cylinders 111*a*, 111*b* expand and contract, whereby front vehicular body unit 102*a* swings with respect to rear vehicular body unit 102*b*. Consequently, a traveling direction of wheel loader 1 is changed.

In FIG. 1, only one of the steering cylinders 111*a*, 111*b* is illustrated, and the other is omitted.

Work implement 103 and a pair of front wheels 104*a* are attached to the front vehicular body unit 102*a*. Work implement 103 is disposed in front of the vehicular body 102. Work implement 103 is driven by the hydraulic oil from a hydraulic pump 8 (see FIG. 2). Work implement 103 includes a boom 106, a pair of lift cylinders 114*a*, 114*b*, a bucket 107, a bell crank 109, and a tilt cylinder 115.

Boom 106 is rotatably supported by front vehicular body unit 102*a*. A proximal end of boom 106 is swingably attached to front vehicular body unit 102*a* by a boom pin 116. One end of each of lift cylinders 114*a*, 114*b* is attached to front vehicular body unit 102*a*. The other end of each of lift cylinders 114*a*, 114*b* is attached to boom 106. Front vehicular body unit 102*a* and boom 106 are coupled to each other by lift cylinders 114*a*, 114*b*. Lift cylinders 114*a*, 114*b* expand and contract by the hydraulic oil from hydraulic pump 8, whereby boom 106 swings vertically about boom pin 116.

In FIG. 1, only one of lift cylinders 114*a*, 1141D is illustrated, and the other is omitted.

Bucket 107 is rotatably supported at a distal end of boom 106. Bucket 107 is swingably instructed at the distal end of boom 106 by bucket pin 117. One end of tilt cylinder 115 is attached to front vehicular body unit 102*a*. The other end of tilt cylinder 115 is attached to bell crank 109. Bell crank 109 and bucket 107 are coupled to each other by a link device (not illustrated). Front vehicular body unit 102*a* and bucket 107 are coupled to each other by tilt cylinder 115, bell crank 109, and the link device. Tilt cylinder 115 expands and contracts by the hydraulic oil from hydraulic pump 8, whereby bucket 107 swings vertically about bucket pin 117.

Operator's cab 105 and a pair of rear wheels 104*b* are attached to rear vehicular body unit 102*b*. Operator's cab 105 is mounted on vehicular body 102. A seat on which the operator is seated, and an operating device (to be described later) are installed in operator's cab 105.

An angle sensor 144 (to be described in detail later) is provided in front vehicular body unit 102*a*.

B. SYSTEM CONFIGURATION

Figure 2:
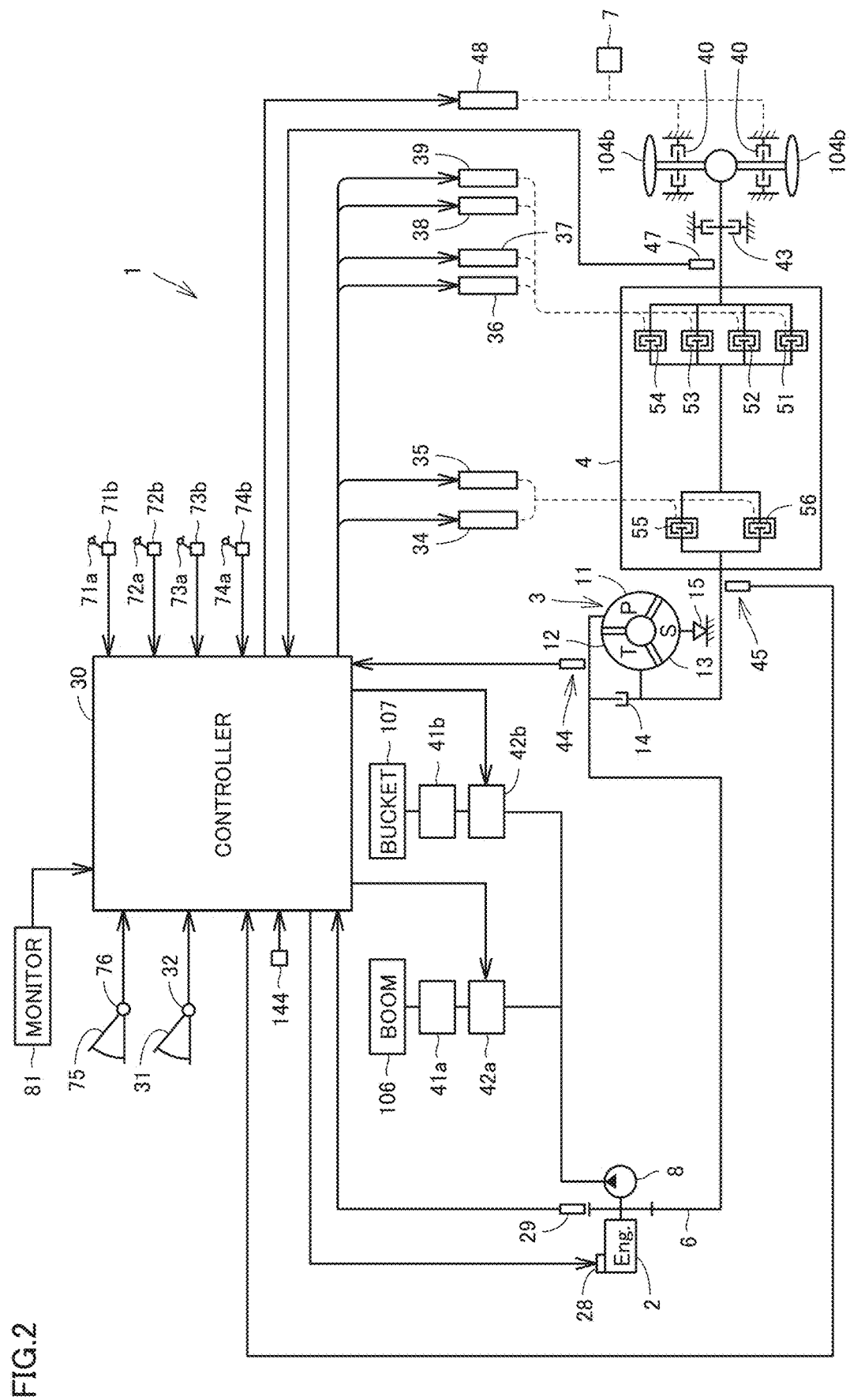
FIG. 2 is a schematic diagram illustrating a configuration of the wheel loader.

FIG. 2 is a schematic diagram illustrating a configuration of wheel loader 1. As illustrated in FIG. 2, a transfer 6, a torque converter 3, a transmission 4, a parking brake 43, and a service brake 40 are provided in a driving force transmission path 90 from an engine 2 to wheel 104*b*.

An output shaft of engine 2 is coupled to transfer 6. Transfer 6 is coupled to hydraulic pump 8.

An engine rotation speed sensor 29 that detects a rotation speed Ne of an output shaft is provided on the output shaft of engine 2. Engine rotation speed sensor 29 transmits a detection signal indicating rotation speed Ne to a controller 30.

Part of the output of engine 2 is transmitted to wheel 104*b* through transfer 6, torque converter 3, and transmission 4. Consequently, wheel loader 1 travels. A traveling speed Vt of wheel loader 1 can be controlled by an accelerator pedal 31 provided in operator's cab 105. When the operator presses down on accelerator pedal 31, an accelerator operation amount sensor 32 transmits a detection signal indicating a pressing operation amount of accelerator pedal 31 to controller 30.

The rest of the output of engine 2 is transmitted to hydraulic pump 8 through transfer 6. Consequently, hydraulic pump 8 is driven. Hydraulic pump 8 supplies hydraulic oil to a hydraulic actuator 41*a* that drives boom 106 through an operation valve 42*a*. Vertical movement of boom 106 can be controlled by operating a boom control lever 71*a* provided in operator's cab 105. Hydraulic pump 8 also supplies the hydraulic oil to a hydraulic actuator 41*b* that drives bucket 107 through an operation valve 42*b*. Action of bucket 107 can be controlled by operating a bucket control lever 72*a* provided in operator's cab 105.

As described above, wheel loader 1 can repeatedly perform a series of operations such as excavation, backward movement, dump approach, soil ejection, and backward movement using the output of engine 2. Among these operations, in the dump approach, action of moving forward work implement 103 at a small speed toward a dump truck 900 while raising work implement 103 loaded with soil is performed.

Torque converter 3 is provided between transfer 6 and transmission 4. Torque converter 3 includes a pump impeller 11, a turbine runner 12, a stator 13, a lock-up clutch 14, and a one-way clutch 15. Pump impeller 11 is coupled to engine 2. Turbine runner 12 is coupled to transmission 4. Stator 13 is a reaction element provided between pump impeller 11 and turbine runner 12. Lock-up clutch 14 freely connects and disconnects the power transmission between pump impeller 11 and engine 2 by engaging and disengaging (in a neutral state) pump impeller 11 and turbine runner 12. Lock-up clutch 14 is hydraulically operated. One-way clutch 15 allows the rotation of stator 13 in only one direction.

A torque converter input rotation speed sensor 44 that detects a rotation speed Nc of pump impeller 11 is provided in pump impeller 11 of torque converter 3. Torque converter input rotation speed sensor 44 transmits a detection signal indicating rotation speed Nc to controller 30.

Transmission 4 includes a forward clutch 55 (an example of the forward clutch) corresponding to a forward traveling stage and a reverse clutch 56 corresponding to a reverse traveling stage. Transmission 4 includes a first speed clutch 51, a second speed clutch 52, a third speed clutch 53, and a fourth speed clutch 54 corresponding to the first to fourth speed stages, respectively. Forward clutch 55 and reverse clutch 56 are a direction switching clutch, and first to fourth speed clutches 51 to 54 are a speed switching clutch. Each of clutches 51 to 56 is constructed with a wet multiplate hydraulic clutch. Transmission 4 selectively engages and disengages respective clutches 51 to 56 according to the traveling direction of the wheel loader, the necessary driving force, and necessary traveling speed Vt.

Engagement pressure between an input side and an output side of each of clutches 51 to 56 of transmission 4 can be controlled by the hydraulic pressure of the hydraulic oil supplied to each of clutches 51 to 56. In the embodiment, each of clutch 51 to 56 shifts from disengagement, through semi-engagement, to complete engagement as the hydraulic pressure of the supplied hydraulic oil increases. Clutch control valves 34 to 39 adjust clutch hydraulic pressures supplied to clutch control valves 34 to 39 according to clutch hydraulic pressure instruction signals transmitted from controller 30 to clutch control valves 34 to 39, respectively, thereby controlling the engagement pressures of clutches 51 to 56. Each of clutch control valves 34 to 39 is an electronic control type proportional solenoid valve.

A transmission input shaft rotation speed sensor 45 that detects a rotation speed Nt0 of the input shaft is provided on the input shaft of transmission 4. Transmission input shaft rotation speed sensor 45 transmits a detection signal indicating rotation speed Nt0 to controller 30.

A transmission output shaft rotation speed sensor 47 that detects a rotation speed Nt2 of the output shaft is provided on the output shaft of transmission 4. Transmission output shaft rotation speed sensor 47 transmits a detection signal indicating rotation speed Nt2 to controller 30.

Parking brake 43 is disposed between transmission 4 and service brake 40. Parking brake 43 is attached to the output shaft. Parking brake 43 is a negative brake that mainly parks the wheel loader. Parking brake 43 is a wet multiplate brake that can switch between a braking state and a non-braking state. The engagement pressure of parking brake 43 can be adjusted by an operation amount of a parking brake lever disposed in the driver's seat.

Service brake 40 is disposed between parking brake 43 and wheel 104b. Service brake 40 is attached to an axle coupled to wheel 104b. Service brake 40 is a brake that is mainly used to decelerate or stop during traveling. Service brake 40 is a so-called positive brake of a wet multiplate type that can switch between the braking state and the non-braking state. A brake control valve 48 adjusts brake hydraulic pressure supplied to service brake 40 according to a brake hydraulic pressure instruction signal transmitted from controller 30 to brake control valve 48, thereby controlling the engagement pressure (that is, braking force) of service brake 40.

Controller 30 adjusts an accelerator opening degree based on the detection signal from accelerator operation amount sensor 32, and transmits a fuel injection amount instruction signal to an electronic control type fuel injector 28. Electronic control type fuel injector 28 determines the injection amount instruction signal, adjusts a fuel injection amount injected into a cylinder, and controls the output (rotation speed) of engine 2. Accelerator operation amount sensor 32 is also referred to as an accelerator opening degree sensor.

When boom control lever 71a is operated, a boom operation detector 71b transmits a boom operation signal based on the operation to controller 30. In response to the boom operation signal, controller 30 transmits a boom hydraulic pressure instruction signal to operation valve 42a. Operation valve 42a determines the boom hydraulic pressure instruction signal, and controls an amount of the hydraulic oil supplied from hydraulic pump 8 to hydraulic actuator 41a. An action speed of boom 106 is adjusted by adjusting the operation amount of boom control lever 71a.

When bucket control lever 72a is operated, bucket operation detector 72b transmits a bucket operation signal based on the operation to controller 30. Controller 30 transmits a bucket hydraulic pressure instruction signal to operation valve 42b according to the bucket operation signal. Operation valve 42b determines the bucket hydraulic pressure instruction signal, and controls an amount of the hydraulic oil supplied from hydraulic pump 8 to hydraulic actuator 41b. The operation speed of bucket 107 is adjusted by adjusting the operation amount of bucket control lever 72a.

When a forward and reverse switching lever 73a is operated, a forward and reverse switching detector 73b transmits a forward and reverse switching operation signal corresponding to an operation position of forward and reverse switching lever 73a to controller 30. Controller 30 transmits a clutch hydraulic pressure instruction signal to forward and reverse clutch control valves 34, 35 according to the forward and reverse switching operation signal. Forward and reverse clutch control valves 34, 35 determine the clutch hydraulic pressure instruction signal, and cause one of the forward clutch 55 and the reverse clutch 56 to engage.

When a speed change lever 74a is operated, a speed change detector 74b transmits a speed change switching operation signal corresponding to the operation position of speed change lever 74a to controller 30. Controller 30 transmits the clutch hydraulic pressure instruction signal to each of speed change clutch control valves 36 to 39 in response to the speed change switching operation signal. Each of speed change clutch control valves 36 to 39 determines the clutch hydraulic pressure instruction signal, and causes any one of the speed stage clutches (speed change clutches) 51 to 54 of the transmission 4 to engage.

When the operator presses down on a brake pedal 75, a brake operation amount sensor 76 transmits a detection signal indicating a pressing operation amount of brake pedal 75 to controller 30.

Controller 30 transmits the brake hydraulic pressure instruction signal to brake control valve 48 according to the pressing operation amount of brake pedal 75. Brake control valve 48 determines the brake hydraulic pressure instruction signal, and controls the engagement pressure of service brake 40 by adjusting the brake hydraulic pressure supplied to service brake 40.

Controller 30 is connected to an angle sensor 144 that detects inclination of vehicular body 102. As illustrated in FIG. 1, angle sensor 144 is provided in front vehicular body unit 102a. Angle sensor 144 detects a pitch angle of vehicular body 102, and inputs a detection signal to controller 30. Hereinafter, a direction around the axis, which passes through a center of gravity of wheel loader 1 and extends in the right and left direction, is referred to as a pitch direction. The pitch direction is a direction in which a front end of vehicular body 102 drops or rises with respect to the center of gravity of vehicular body 102. The pitch angle is an inclination angle of vehicular body 102 in the pitch direction. The pitch angle is an inclination angle in a fore/aft direction of vehicular body 102 with respect to a reference surface such as a perpendicular direction or a horizontal direction. A method for using angle sensor 144 will be described later.

Controller 30 is connected to a pressure sensor 7 that detects pressure of the hydraulic oil of service brake 40. A method for using a detection result of pressure sensor 7 will be described later.

A monitor 81 displays various kinds of information by display control of controller 30. Monitor 81 receives an input operation to set (change) a setting value Fs (to be described later). Setting value Fs is stored in a memory of controller 30. Monitor 81 is an example of a setting device.

C. OUTLINE OF DUMP APPROACH

The dump approach will be described below as an example of a situation in which wheel loader 1 advances while raising boom 106 in at least a loaded state. The dump truck is an example of an approaching object.

Controller 30 determines the loaded state on condition that bucket 107 is in a tilted state. Alternatively, controller 30 determines the loaded state on condition that bucket 107 is in the tilted state and that the hydraulic pressure on the bottom side of lift cylinders 114a, 1.14b (boom cylinder) is greater than or equal to a predetermined value.

Figure 3:
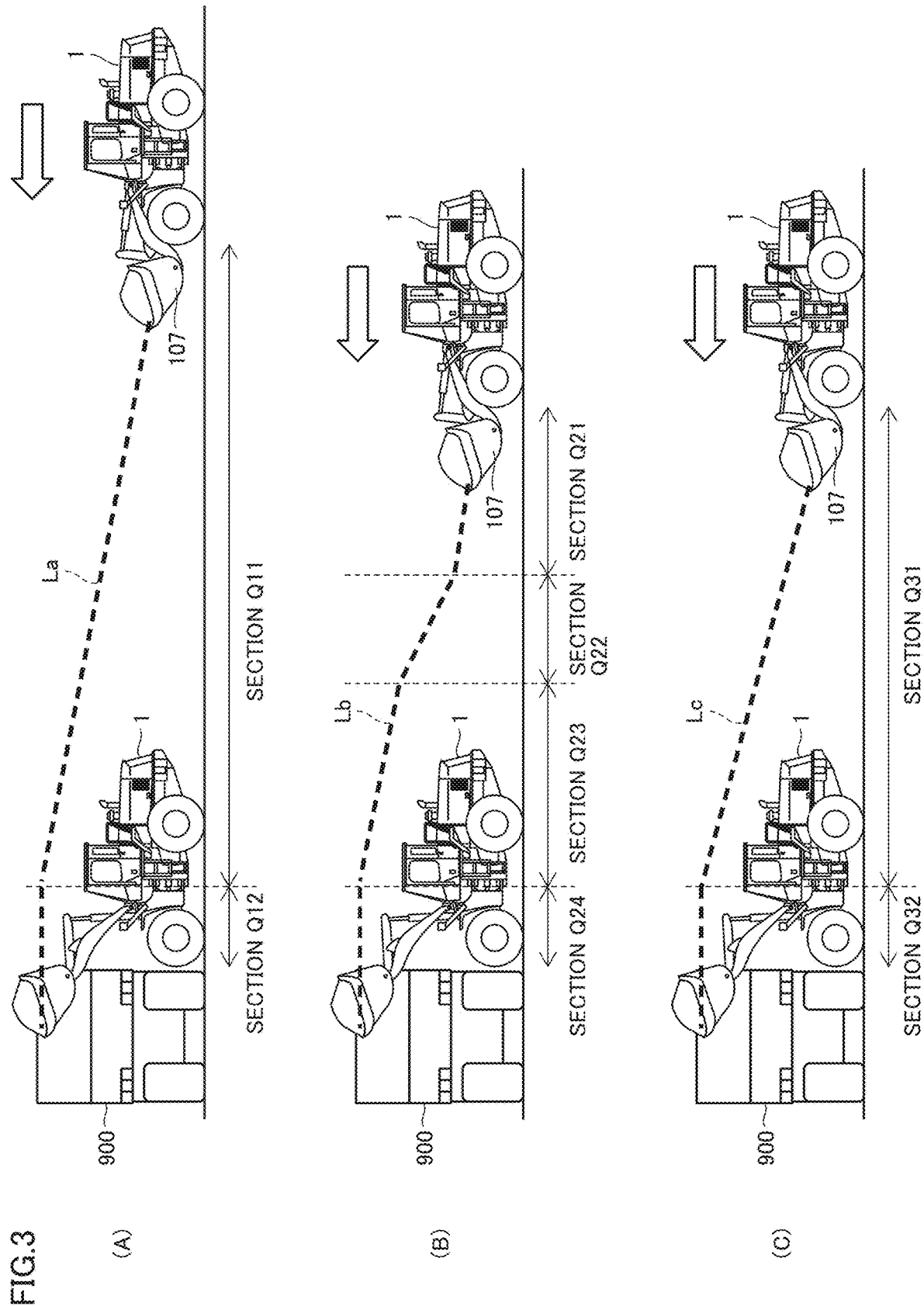
FIG. 3 is a schematic diagram illustrating an outline of dump approach.

FIG. 3 is a schematic diagram illustrating an outline of the dump approach. The dump approach means that wheel loader 1 approaches the dump truck while raising boom 106. In particular, the dump approach means a state in which wheel loader 1 advances to approach the dump truck while a boom lever is subjected to a boom-raising operation. Typically, the dump approach means that wheel loader 1 advances to approach the dump truck at the second speed gear while boom control lever 71a is subjected to the boom-raising operation.

In the following description, for convenience, when the boom 106 is raised, the description will be given on the assumption that a boom-raising speed is kept constant.

Wheel loader 1 performs the clutch hydraulic pressure control described with reference to FIG. 3(C). In order to clarify the features of the clutch hydraulic pressure control, an operator's operation (conventional operator's operation) when the clutch hydraulic pressure control is not performed will be described below as a comparative example with reference to FIGS. 3(A) and 3(B).

FIG. 3(A) is a view illustrating an operator's operation in the case where a distance between the wheel loader and the dump truck is sufficiently secured. As illustrated in FIG. 3(A), the operator performs an accelerator operation in a section Q11. Specifically, the operator presses down on accelerator pedal 31. In section Q11, the operator also operates boom control lever 71a in order to raise boom 106. Consequently, in section Q11, the boom-raising operation is performed while wheel loader 1 travels toward dump truck 900.

The reason why the operator operates the accelerator operation in section Q11 is to sufficiently supply the hydraulic pressure to lift cylinders 114a, 114b, rather than to cause wheel loader 1 to travel. The engine rotation speed is increased to ensure the output of hydraulic oil from the hydraulic pump. Thus, even if the operator presses down on the brake pedal in order to slow down the vehicle speed in section Q11, the operator presses continuously down on the accelerator pedal.

In a section Q12 subsequent to section Q11, the operator stops the accelerator operation, and performs the brake operation. Specifically, the operator stops to press down on accelerator pedal 31 and presses down on brake pedal 75. Consequently, the operator stops wheel loader 1 before dump truck 900. Thereafter, the operator operates the bucket control lever 72a to load the soil scooped by the bucket 107 onto the cargo box of the dump truck 900.

In the case where the series of operations is performed, a passing trajectory of bucket 107 is typically represented by a broken line La.

FIG. 3(B) is a view illustrating an operator's operation in the case where the distance between the wheel loader and the dump truck is insufficiently secured. In particular, FIG. 3(B) is a view illustrating the operator's operation in the case where the clutch hydraulic pressure control to be described with reference to FIG. 3(C) is not performed.

As illustrated in FIG. 3(B), in a section Q21, the operator performs the accelerator operation without performing the brake operation. In section Q21, the operator operates boom control lever 71a in order to raise boom 106. Consequently, in section Q21, the boom-raising operation is performed while wheel loader 1 travels toward dump truck 900.

In a section Q22 subsequent to section Q21, the operator performs the brake operation together with the accelerator operation. Specifically, the operator presses simultaneously down on accelerator pedal 31 and brake pedal 75. Consequently, boom 106 is raised at the same boom-raising speed as section Q21 while a forward speed of wheel loader 1 is reduced.

In consideration of the distance between wheel loader 1 and dump truck 900 and the position of bucket 107, the operator stops the brake operation and performs only the accelerator operation (section Q23).

In a section Q24 subsequent to section Q23, the operator stops the accelerator operation and performs the brake operation to stop wheel loader 1 before dump truck 900. Thereafter, the operator operates the bucket control lever 72a to load the soil scooped by the bucket 107 onto the cargo box of the dump truck 900.

In the case where the series of operations is performed, the passing trajectory of bucket 107 is typically represented by a broken line Lb.

FIG. 3(C) is a view illustrating the operator's operation in the case where the distance between the wheel loader and the dump truck is insufficiently ensured similarly to FIG. 3(B). In particular, FIG. 3(C) is a view illustrating the trajectory of bucket 107 during the performance of the clutch hydraulic pressure control in which the forward clutch 55 is brought into the semi-engagement state by controlling the hydraulic pressure of the hydraulic oil supplied to forward clutch 55 during the dump approach.

As illustrated in FIG. 3(C), the operator performs an accelerator operation in a section Q31. Specifically, the operator presses down on accelerator pedal 31. In section Q31, the operator operates boom control lever 71a in order to raise boom 106. Consequently, in section Q31, the boom-raising operation is performed while wheel loader 1 travels toward dump truck 900. In section Q31, the operator does not perform the brake operation.

Figure 4:
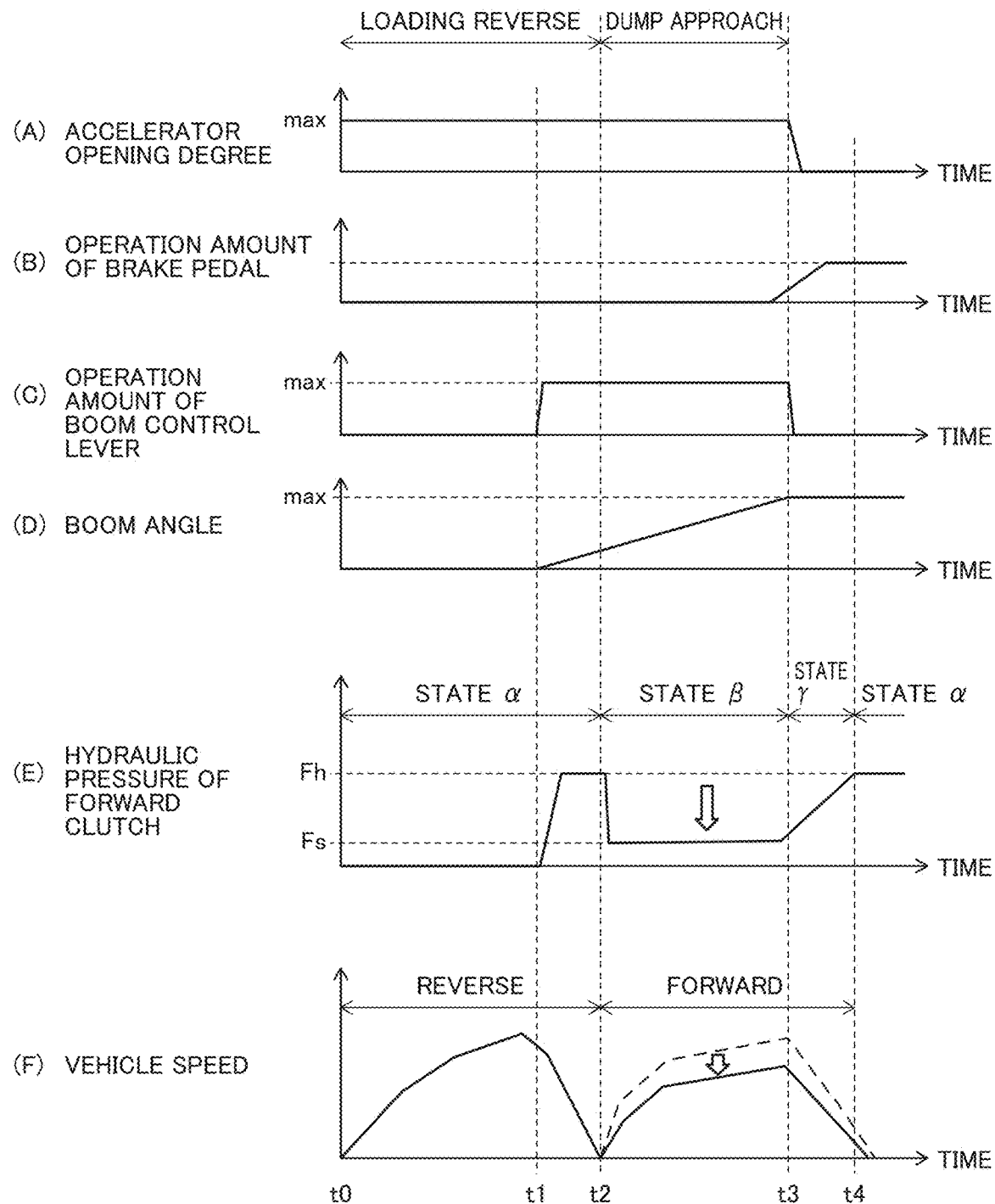
FIG. 4 is a time chart illustrating an operator's operation and a state of the wheel loader during loading reverse and dump approach.
Figure 5:
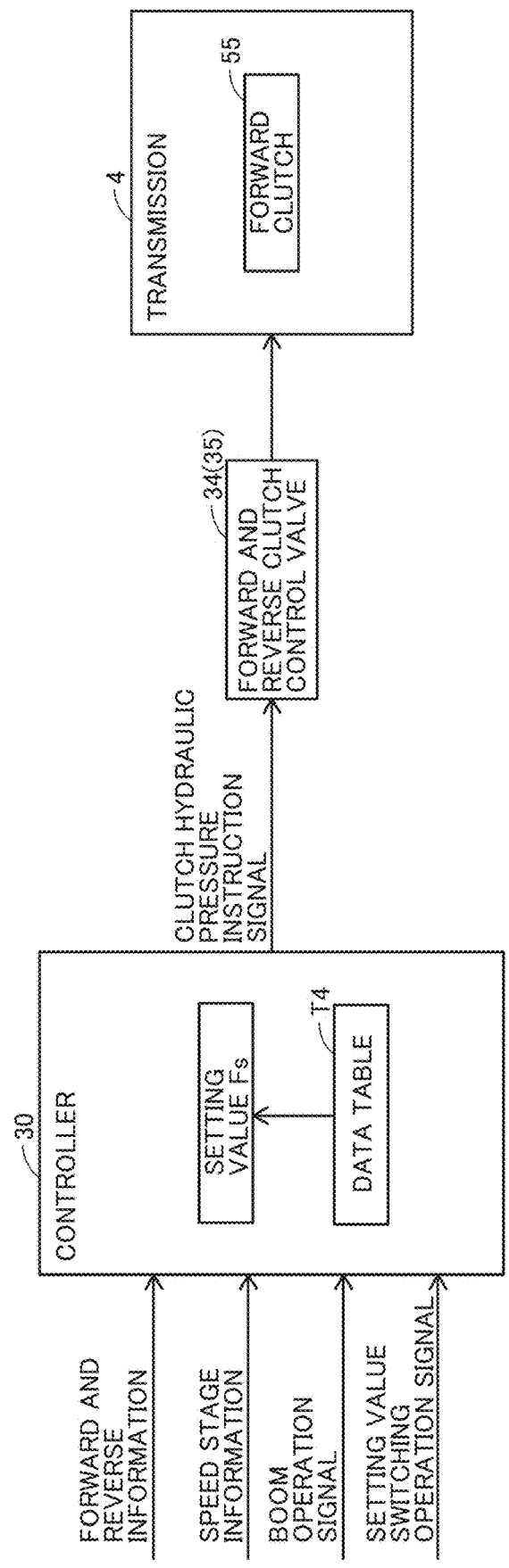
FIG. 5 is a view illustrating a specific configuration that performs clutch hydraulic pressure control described with reference to FIG. 4.

In section Q31, wheel loader 1 reduces the hydraulic pressure of the hydraulic oil supplied to forward clutch 55 to a setting value to bringing forward clutch 55 into the semi-engagement state. Consequently, the vehicle speed of wheel loader 1 is reduced lower than that of the complete engagement state of forward clutch 55. For example, the vehicle speed of wheel loader 1 is reduced lower than the vehicle speeds of sections Q21 and Q23 in FIG. 3(B). On the other hand, the operation amount of the accelerator is identical to that of the state immediately before the hydraulic pressure of the hydraulic oil supplied to the forward clutch 55 is reduced to the setting value, so that the speed of raising the boom 106 is not reduced. For this reason, in wheel loader 1, bucket 107 can be raised higher than or equal to a height of a cargo box of dump truck 900 even at a distance (section Q31) shorter than section Q11 in FIG. 3(A) by such clutch hydraulic pressure control. Details of the hydraulic pressure control of forward clutch 55 will be described later (FIGS. 4 and 5).

In a section Q32 subsequent to section Q31, the operator stops the accelerator operation, and performs the brake operation. Specifically, the operator stops to press down on accelerator pedal 31 and presses down on brake pedal 75. Consequently, the operator stops wheel loader 1 before dump truck 900. Thereafter, the operator operates the bucket control lever 72a to load the soil scooped by the bucket 107 onto the cargo box of the dump truck 900.

In the case where the series of operations is performed, the passing trajectory of bucket 107 is typically represented by a broken line Lc.

The operator can select whether to perform the clutch hydraulic pressure control described with reference to FIG. 3(C). Wheel loader 1 may be configured such that the operator can select on and off of the clutch hydraulic pressure control function.

D. CLUTCH HYDRAULIC PRESSURE CONTROL DURING DUMP APPROACH

Hereinafter, hydraulic pressure control of the hydraulic oil supplied to forward clutch 55, which is performed during the dump approach, will be described below with a specific example. In particular, the details of the clutch hydraulic pressure control described with reference to FIG. 3(C) will be described. Hereinafter, the hydraulic pressure of hydraulic oil supplied to forward clutch 55 is also referred to as "hydraulic pressure of forward clutch 55".

FIG. 4 is a time chart illustrating the operator's operation and the state of wheel loader 1 during the loading reverse and the dump approach. In particular, FIG. 4 is a graph illustrating an accelerator opening degree (FIG. 4(A)), the operation amount of brake pedal 75 (FIG. 4(B)), the operation amount of boom control lever 71a (FIG. 4(C)), a boom angle (FIG. 4(D)), the hydraulic pressure of forward clutch 55 (FIG. 4(E)) and the vehicle speed of wheel loader 1 (FIG. 4(F)) while a horizontal axis is represented as an identical time axis.

As illustrated in FIG. 4, wheel loader 1 performs the loading reverse in a period from time t0 to time t2. The "loading reverse" means that wheel loader 1 reverses to the position where the dump approach is started after the soil is scraped from the natural ground by bucket 107.

A relationship among the accelerator opening degree, the operation amount of brake pedal 75, the operation amount of boom control lever 71a, and the boom angle will be described first.

During the loading reverse (time t0 to t2), the operator presses down accelerator pedal 31 until the throttle valve is fully opened (full throttle). In this case, the operator does not operate brake pedal 75. As an example, when approaching a dump approach start position, the operator operates boom control lever 71a to the maximum amount at time t1 (t0<t1<t2) in order to gain a boom-raising time. Consequently, boom 106 starts to rise.

At time t2, the operator stops the reverse and starts the dump approach. Wheel loader 1 performs the boom-raising operation while advancing. Even in the dump approach, the operator continuously presses down on accelerator pedal 31 from the loading reverse. The operator starts to press down brake pedal 75 when boom 106 is raised to the maximum angle and when wheel loader 1 reaches the vicinity of the dump truck.

When the dump approach is ended (time t3), the operator stops the operation of accelerator pedal 31. The operator presses down on brake pedal 75 to a predetermined position and maintains that state. Boom 106 is raised to the maximum angle at time t3, so that the operator stops the operation of boom control lever 71a.

A relationship between the hydraulic pressure of forward clutch 55 and the vehicle speed of wheel loader 1 after time t0 will be described below.

When forward and reverse switching lever 73a is switched to the forward side by the operator's operation, controller 30 of wheel loader 1 performs the hydraulic pressure control for bringing reverse clutch 56 into a neutral state and the hydraulic pressure control for bringing forward clutch 55 into a complete engagement state from the neutral state. Consequently, at time t2, the hydraulic pressure of forward clutch 55 reaches a predetermined holding pressure Fh, and forward clutch 55 becomes the complete engagement state. Then, the dump approach is started.

When the dump approach is started, controller 30 performs the control for reducing the hydraulic pressure of forward clutch 55 from holding pressure Fh to a setting value Fs at which forward clutch 55 becomes the semi-engagement state. When the dump approach is ended, controller 30 performs the control for gradually increasing the hydraulic pressure of forward clutch 55 from setting value Fs to holding pressure Fh. In FIG. 4(E), at time t4, the hydraulic pressure of forward clutch 55 is kept at holding pressure Fh.

Forward clutch 55 is in the semi-engagement state in at least the period from time t2 to time t3, so that the forward vehicle speed of wheel loader 1 is lower than that in the complete engagement state. A broken line in FIG. 4(F) represents the speed of wheel loader 1 in the case of assuming that the hydraulic pressure of forward clutch 55 is the holding pressure Fh between time t2 and time t4.

Hereinafter, with respect to the hydraulic pressure control of forward clutch 55, the control state between time t0 and time t2 is referred to as a "state α", the control state between time t2 and time t3 is referred to as a "state β", and the control state between the time t3 and time t4 is also referred to as a "state γ". After the state γ, the state shifts to the state α.

FIG. 5 is a view illustrating a specific configuration that performs the clutch hydraulic pressure control described with reference to FIG. 4.

As illustrated in FIG. 5, controller 30 stores a data table T4 and setting value Fs. A correspondence relationship between the hydraulic pressure of forward clutch 55 and a current value of the clutch hydraulic pressure instruction signal is defined in data table T4.

Controller 30 determines whether the dump approach is being performed based on the forward and reverse switching operation signal, the speed change switching operation signal, and the boom operation signal. Typically, when the speed change stage is located in the second speed gear and when wheel loader 1 advances while the boom is raised, the controller 30 determines that wheel loader 1 is in the dump approach state.

When determining that the dump approach is being performed, controller 30 refers to data table T4 to generate the clutch hydraulic pressure instruction signal of the current value corresponding to setting value Fs. Controller 30 transmits the generated clutch hydraulic pressure instruction signal to forward and reverse clutch control valves 34, 35. Consequently, the hydraulic oil is supplied to forward clutch 55 in transmission 4, and the hydraulic pressure of forward clutch 55 becomes setting value Fs.

When receiving the operator's operation to change setting value Fs, monitor 81 transmits a setting value switching operation signal to controller 30. When receiving the setting value switching operation signal, controller 30 changes setting value Fs such that setting value Fs becomes a value corresponding to the setting value switching operation signal. Setting value Fs that can be set by monitor 81 is a value within a range where forward clutch 55 becomes the semi-engagement state.

For example, controller 30 displays a plurality of objects (images) on monitor 81, and the value correlated with the object is set to setting value Fs by selecting one of the plurality of objects. Examples of a plurality of objects include objects in each of which a setting level is indicated. Examples of the objects include displayed images such as "large setting value", "middle setting value", and "small setting value", or "level 3", "level 2", and "level 1".

The setting of setting value Fs is not limited to that by monitor 81, and a dial that sets setting value Fs may be provided in operator's cab 105.

As described above, controller 30 performs the clutch hydraulic pressure control in which forward clutch 55 is brought into the semi-engagement state by controlling the hydraulic pressure of the hydraulic oil supplied to forward clutch 55 on condition that wheel loader 1 advances and approaches dump truck 900 while raising boom 106 (during the dump approach).

When forward clutch 55 becomes the semi-engagement state during the dump approach, passing torque passing through forward clutch 55 decreases. Tractive force of wheel loader 1 also decreases. Thus, in wheel loader 1, a degree of dragging of the brake can be decreased as compared with the case where the hydraulic pressure of forward clutch 55 is not reduced to setting value Fs at which forward clutch 55 becomes the semi-engagement state. As a result, the wheel loader 1 can reduce wear of a brake pad of service brake 40 as well as fuel consumption of wheel loader 1 as compared with the case where the hydraulic pressure of forward clutch 55 is not reduced to setting value Fs at which forward clutch 55 becomes the semi-engagement state.

In particular, even if the distance between the wheel loader and the dump truck is insufficient, necessity of the brake operation is eliminated except for the brake operation immediately before dump truck 900. Therefore, wear of the brake pad can be reduced, and fuel consumption of wheel loader 1 can be reduced. The operator's operation is simplified because the simultaneous operations of accelerator pedal 31 and brake pedal 75 can be eliminated during dump approach.

As described above, according to wheel loader 1, the operation efficiency can be improved.

More particularly, controller 30 controls the hydraulic pressure of forward clutch 55 such that the hydraulic pressure is kept constant during the dump approach. Consequently, the operator can finely adjust the forward speed of wheel loader 1 as compared with the configuration in which the hydraulic pressure of forward clutch 55 is not kept constant.

Monitor 81 receives the operator's operation to set setting value Fs as described above. Consequently, the forward speed of wheel loader 1 during the dump approach can be changed to a setting desired by the operator.

During the clutch hydraulic pressure control, controller 30 can determine whether the clutch is in the semi-engagement state or the complete engagement state based on the passing torque of the clutch.

In particular, controller 30 can determine whether forward clutch 55 is in the semi-engagement state or the complete engagement state based on the detection value of transmission input shaft rotation speed sensor 45 (first rotation speed sensor) that detects the rotation speed of the input shaft of the transmission 4 including forward clutch 55 and the detection value of the transmission output shaft rotation speed sensor 47 (second rotation speed sensor) that detects the rotation speed of the output shaft of transmission 4.

More particularly, controller 30 estimates the rotation speed of the output shaft from the detection value of transmission input shaft rotation speed sensor 45. Controller 30 calculates a difference between the estimated rotation speed and the detection value of transmission output shaft rotation speed sensor 47. When the calculated difference is greater than or equal to a predetermined threshold, controller 30 determines that forward clutch 55 becomes the semi-engagement state.

E. CONTROL STRUCTURE

Figure 6:
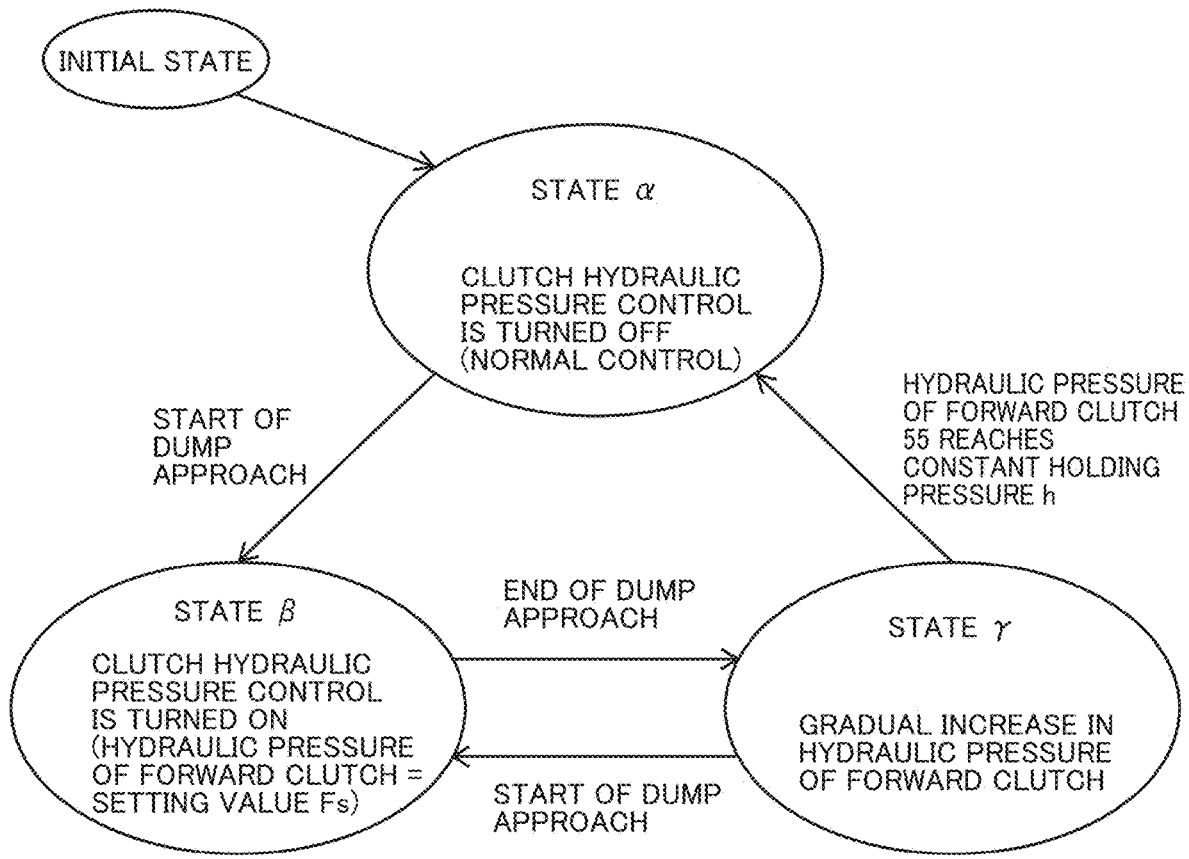
FIG. 6 is a state shift diagram illustrating shift of a control state of a forward clutch.

FIG. 6 is a state shift diagram illustrating shift of the control state of forward clutch 55.

As illustrated in FIG. 6, controller 30 shifts the control state of the hydraulic pressure of forward clutch 55 from the initial state to state α (the state between time t0 and time t2 in FIG. 4). In state α, controller 30 does not perform the clutch hydraulic pressure control for reducing the hydraulic pressure of forward clutch 55 to setting value Fs as described above.

When the dump approach is started in state α, controller 30 shifts the control state of forward clutch 55 from state α to state β (the state between the time t2 and the time t3 in FIG. 4). In state β, as described above, controller 30 performs the clutch hydraulic pressure control for reducing the hydraulic pressure of forward clutch 55 to setting value Fs.

When the dump approach is ended in state β, controller 30 shifts the control state of forward clutch 55 from state β to state γ (the state between time t3 and time t4 in FIG. 4). In state γ, as described above, controller 30 performs the control for gradually increasing the hydraulic pressure of forward clutch 55 from setting value Fs.

When the hydraulic pressure of forward clutch 55 reaches holding pressure Fh in state γ, controller 30 shifts the control state of forward clutch 55 from state γ to state α. When the dump approach is restarted before the hydraulic pressure of forward clutch 55 reaches holding pressure Fh in state γ, controller 30 shifts the control state of forward clutch 55 from state γ to state β.

Figure 7:
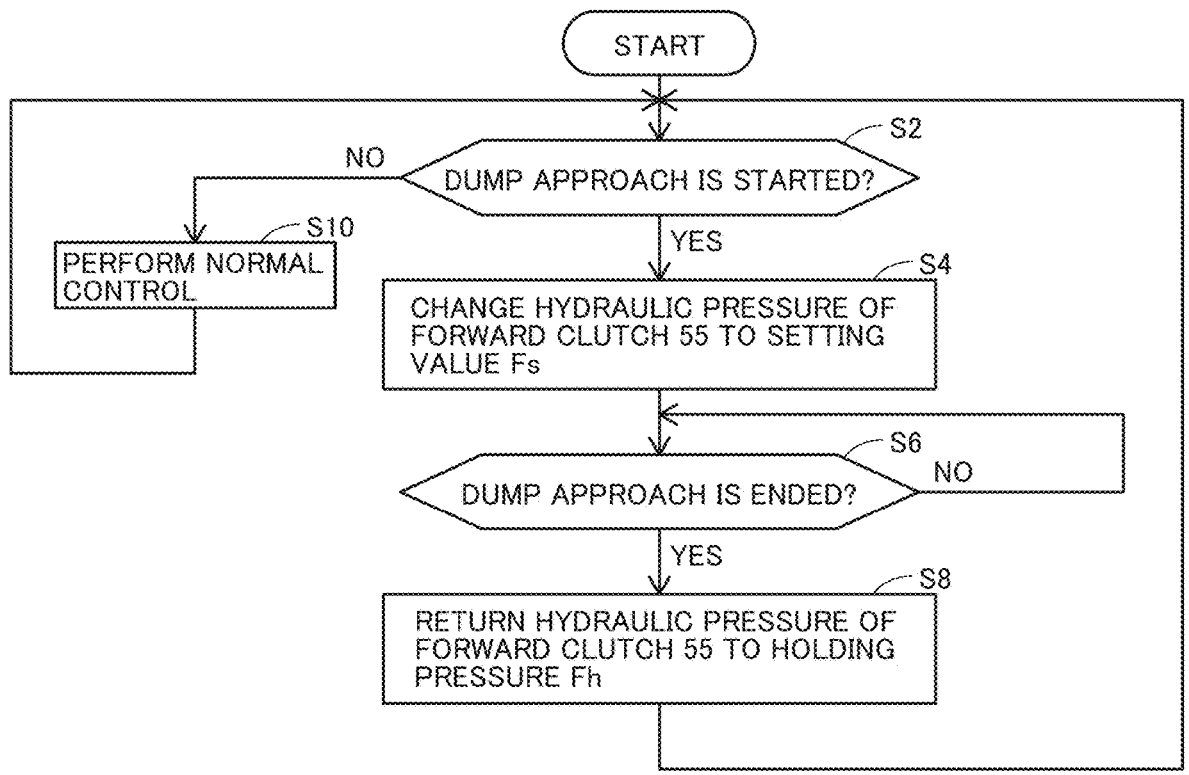
FIG. 7 is a flowchart illustrating an example of a processing flow for hydraulic pressure control of the forward clutch.

FIG. 7 is a flowchart illustrating an example of a processing flow for the hydraulic pressure control of forward clutch 55 of wheel loader 1.

As illustrated in FIG. 7, in step S2, controller 30 determines whether the dump approach is started. When determining that the dump approach is started (YES in step S2), controller 30 performs the control for changing the hydraulic pressure of forward clutch 55 to setting value Fs in step S4. When determining that the dump approach is not started (NO in step S2), controller 30 goes to step S10 to continue the normal control.

In step S6, controller 30 determines whether the dump approach is ended. When determining that the dump approach is ended (YES in step S6), controller 30 performs the control for returning the hydraulic pressure of forward clutch 55 to holding pressure Fh in step S8. When determining that the dump approach is not ended (NO in step S6), controller 30 returns to step S6 to repeat the processing in step S6.

F. SUMMARY (1) Wheel loader 1 includes boom 106, forward clutch 55, and controller 30 that controls the hydraulic pressure of the hydraulic oil supplied to forward clutch 55. Controller 30 performs the clutch hydraulic pressure control in which forward clutch 55 is brought into the semi-engagement state by controlling the hydraulic pressure of forward clutch 55 on condition that wheel loader 1 advances while raising boom 106 in at least the loaded state. In particular, controller 30 performs the clutch hydraulic pressure control in which forward clutch 55 is brought into the semi-engagement state by controlling the hydraulic pressure of forward clutch 55 on condition that wheel loader 1 advances and approaches dump truck 900 in the loaded state and that boom control lever 71a receives the boom-raising operation.

When forward clutch 55 is in the semi-engagement state during the dump approach, passing torque passing through forward clutch 55 decreases. Tractive force of wheel loader 1 also decreases. Thus, in wheel loader 1, a degree of dragging of the brake can be decreased as compared with the case where the hydraulic pressure of forward clutch 55 is not reduced to the semi-engagement state. As a result, the wheel loader 1 can reduce wear of a brake pad of service brake 40 as well as fuel consumption of wheel loader 1 as compared with the case where the hydraulic pressure of forward clutch 55 is not reduced to the semi-engagement state.

In particular, even if the distance between the wheel loader and the dump truck is insufficient, necessity of the brake operation is eliminated except for the brake operation immediately before dump truck 900. Therefore, wear of the brake pad can be reduced, and fuel consumption of wheel loader 1 can be reduced. The operator's operation is simplified because the simultaneous operations of accelerator pedal 31 and brake pedal 75 can be eliminated during dump approach.

As described above, according to wheel loader 1, the operation efficiency can be improved.

(2) In the dump approach, controller 30 controls the hydraulic pressure of forward clutch 55 such that the hydraulic pressure is kept at constant setting value Fs. Consequently, the operator can stabilize the forward speed of wheel loader 1 as compared with the configuration in which the hydraulic pressure is not kept at constant setting value Fs.

(3) Controller 30 further includes monitor 81 that receives the operator's operation to set setting value Fs. Consequently, the forward speed of wheel loader 1 during the dump approach can be changed to a setting desired by the operator.

(4) When wheel loader 1 ends the advance for approaching dump truck 900, controller 30 stops the clutch hydraulic pressure control. Consequently, when the wheel loader ends the advance for approaching the dump truck, the hydraulic pressure of forward clutch 55 can be returned to the value (holding pressure Fh) before the start of the clutch hydraulic pressure control.

(5) In the dump approach, the operator typically puts the speed stage clutch in the second speed. Controller 30 may perform the clutch hydraulic pressure control in which forward clutch 55 is brought into the semi-engagement state by controlling the hydraulic pressure of forward clutch 55 on condition that wheel loader 1 advances and approaches dump truck 900 with the speed stage of the second speed (an example of the predetermined speed stage) and that boom control lever 71a receives the boom-raising operation.

G. MODIFICATIONS (g1. Application to Speed Stage Clutch)

In the above embodiment described above, controller 30 performs the clutch hydraulic pressure control in which forward clutch 55 is brought into the semi-engagement state by controlling the hydraulic pressure of the hydraulic oil supplied to forward clutch 55 on condition that the dump approach is being performed.

However, the present invention is not limited to the embodiment. Alternatively, controller 30 may perform the clutch hydraulic pressure control in which forward clutch 55 is brought into the semi-engagement state by controlling the hydraulic pressure of speed stage clutches 51 to 54 on condition that the dump approach is being performed.

In particular, on condition that the dump approach is being performed, controller 30 may perform the clutch hydraulic pressure control in which the speed stage clutch is brought into the semi-engagement state by controlling the hydraulic pressure of the speed stage clutch corresponding to the operation position of speed change lever 74a among speed stage clutches 51 to 54.

Even in this configuration, the operation efficiency can be improved similarly to the case where speed stage clutches 51 to 54 are brought into the semi-engagement state by controlling the hydraulic pressure of speed stage clutches 51 to 54.

(g2. Use of Distance Measuring Sensor)

In the above embodiment, controller 30 performs the clutch hydraulic pressure control in which forward clutch 55 is brought into the semi-engagement state by controlling the hydraulic pressure of forward clutch 55 to setting value Fs that is the constant value on condition that wheel loader 1 advances and approaches dump truck 900. A configuration, in which controller 30 does not keep the hydraulic pressure of forward clutch 55 at setting value Fs but sets the hydraulic pressure to a value corresponding to the distance between a wheel loader 1A and dump truck 900, will be described below.

Figure 8:
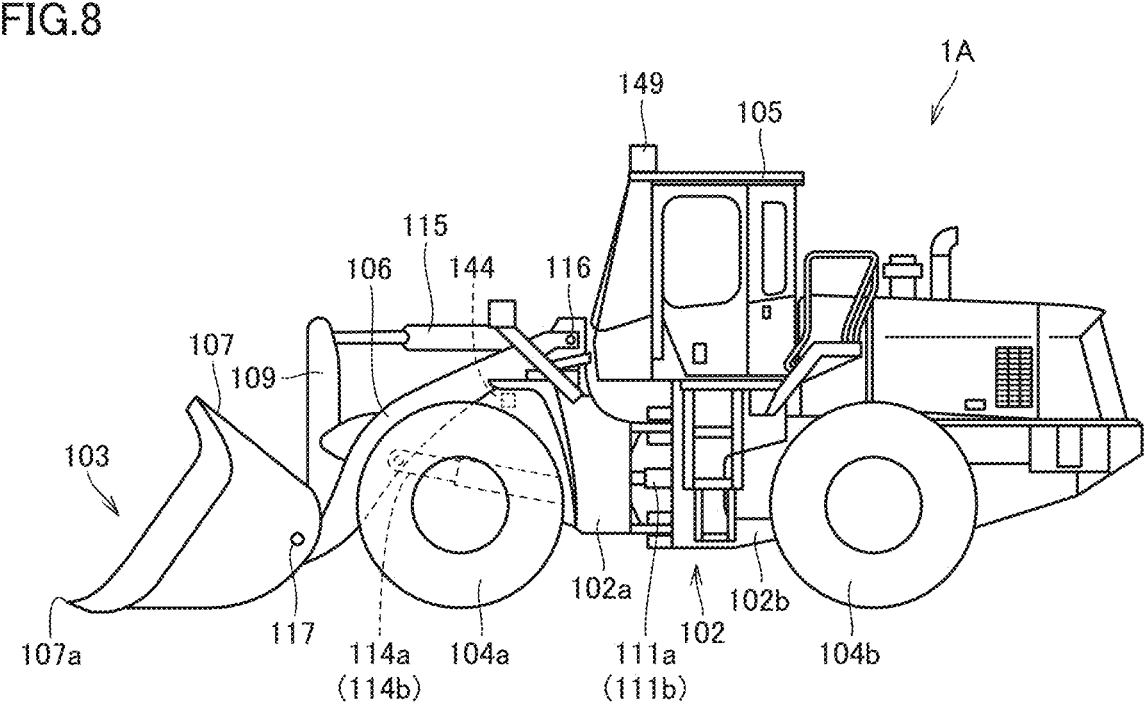
FIG. 8 is an external view of a wheel loader according to a modification.

FIG. 8 is an external view of a wheel loader according to the modification. As illustrated in FIG. 8, wheel loader 1A includes a distance measuring sensor 149 on a roof of operator's cab 105. A hardware configuration of wheel loader 1A is identical to that of wheel loader 1 except that wheel loader 1A includes distance measuring sensor 149. The position of distance measuring sensor 149 is not limited to the position on the roof.

Distance measuring sensor 149 is a sensor that measures the distance between wheel loader 1A and the object ahead. Distance measuring sensor 149 measures the distance to dump truck 900 during the dump approach. Distance measuring sensor 149 may be configured to measure the distance by a laser beam, or may be configured to measure the distance by imaging.

Controller 30 acquires a measurement result from distance measuring sensor 149. When the dump approach is started, controller 30 performs the clutch hydraulic pressure control in which forward clutch 55 is brought into the semi-engagement state by controlling the hydraulic pressure of forward clutch 55 based on the distance measured by the distance measuring sensor 149.

For example, when a measured distance D is a distance Da, controller 30 sets the hydraulic pressure of the hydraulic oil supplied to forward clutch 55 to a first hydraulic pressure, and sets the hydraulic pressure of forward clutch 55 to a second hydraulic pressure lower than the first hydraulic pressure in the case where measured distance D is a distance Db shorter than distance Da.

Figure 9:
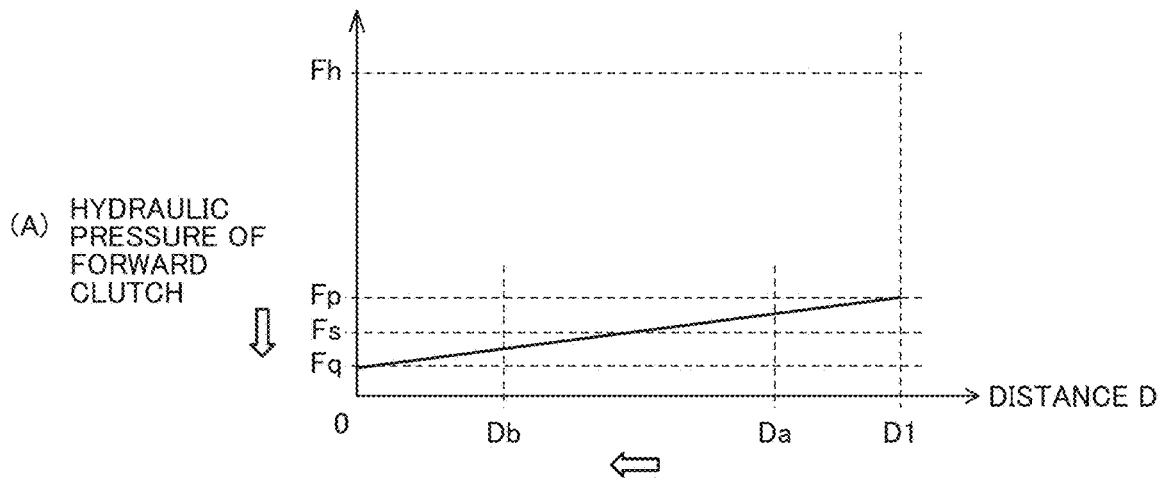
FIG. 9 is a view illustrating a relationship between a measured distance and hydraulic pressure of the forward clutch set by a controller.
Figure 9:
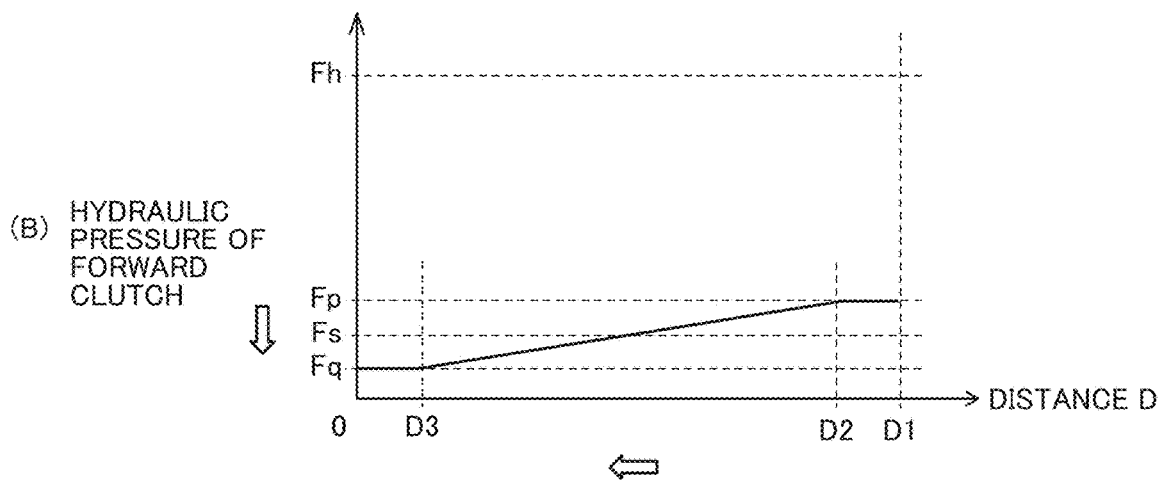

FIG. 9 is a view illustrating a relationship between the measured distance D and the hydraulic pressure of forward clutch 55 set by controller 30. FIG. 9(A) illustrates a first example, and FIG. 9(B) illustrates a second example.

As illustrated in FIG. 9(A), when distance D between wheel loader 1 and dump truck 900 is a distance D1, controller 30 controls the hydraulic pressure of forward clutch 55 to hydraulic pressure Fp at which forward clutch 55 becomes the semi-engagement state. Then, controller 30 gradually reduces the hydraulic pressure of forward clutch 55 from hydraulic pressure Fp as the distance between wheel loader 1 and dump truck 900 shortens. In FIG. 9(A), the hydraulic pressure of forward clutch 55 is set to be Fq when distance D between wheel loader 1 and dump truck 900 is zero.

As described above, during the dump approach, controller 30 reduces the hydraulic pressure of forward clutch 55 as distance D between wheel loader 1 and dump truck 900 shortens, so that the vehicle speed of wheel loader 1 can be reduced as wheel loader 1 approaches dump truck 900.

A method for controlling the hydraulic pressure of forward clutch 55 based on distance D is not limited to the aspect in FIG. 9(A). For example, as illustrated in FIG. 9(B), controller 30 may change the hydraulic pressure of forward clutch 55 within the range of distance D from D2 to D3 (D3<D2<D) according to distance D measured by distance measuring sensor 149. In this case, the hydraulic pressure of forward clutch 55 is controlled so as to become constant value Fp within the range of distance D from D1 to D2 (D2<D1), and so as to become constant value Fq in the case where distance D is less than or equal to D3 (D3<D2).

Controller 30 may control the hydraulic pressure of forward clutch 55 such that forward clutch 55 becomes the neutral state when distance D between wheel loader and dump truck 900 is zero. Alternatively, controller 30 may control the hydraulic pressure of forward clutch 55 such that forward clutch 55 becomes the neutral state when distance D is less than or equal to a predetermined threshold value.

As described above, the configuration in which the hydraulic pressure is controlled based on distance D measured by distance measuring sensor 149 can be applied to not only the hydraulic pressure control of forward clutch 55 but also speed stage clutches 51 to 54. The configuration can also be applied to other clutches, such as an impeller clutch (not illustrated), which are included in driving force transmission path 90 (an example of a power train). Assuming that a modulation clutch is mounted on wheel loader 1A, the above configuration can also be applied to the modulation clutch.

As described above, on condition that wheel loader 1 advances and approaches dump truck 900, controller 30 performs the clutch hydraulic pressure control in which a predetermined clutch is brought into the semi-engagement state by controlling the hydraulic pressure of the hydraulic oil supplied to the predetermined clutch among the plurality of clutches in driving force transmission path 90. In the clutch hydraulic pressure control, controller 30 controls the hydraulic pressure of the hydraulic oil supplied to the predetermined clutch based on the distance measured by distance measuring sensor 149.

Consequently, the hydraulic pressure of the predetermined clutch is reduced as distance D between wheel loader 1 and dump truck 900 shortens, which allows the vehicle speed of wheel loader 1 to be reduced as wheel loader 1 approaches dump truck 900.

(g3. Use of Angle Sensor 144)

Controller 30 may perform the clutch hydraulic pressure control in which forward clutch 55 is brought into the semi-engagement state by controlling the hydraulic pressure of forward clutch 55 on condition that the inclination of vehicular body 102 is less than a predetermined angle.

In a sloping land such as a hill, the time during which forward clutch 55 and the like slide on the hill becomes long, so that a thermal load increases. However, according to the above configuration, when vehicular body 102 is inclined by a predetermined angle or more in the fore/aft direction of vehicular body 102 with respect to the reference surface such as the perpendicular direction and the horizontal direction, controller 30 does not perform the clutch hydraulic pressure control even if the condition of the dump approach is established. Thus, an increase in thermal load can be reduced in the sloping land.

Controller 30 can determine whether the vehicle is traveling on a sloping land based on whether the inclination of vehicular body 102 is greater than or equal to a predetermined angle. The inclination of the vehicular body can be determined based on the detection result of angle sensor 144.

(g4. Measure Against Heat Generation)

Forward clutch 55 is brought into the semi-engagement state during the dump approach, whereby the heat is generated in forward clutch 55. A configuration that prevents a heat generation amount will be described below.

Controller 30 monitors a use state of forward clutch 55. Specifically, controller 30 calculates a calorific value Q of forward clutch 55. Calorific value Q of forward clutch 55 can be calculated by the following equation (1) using a heat radiation amount R(t), a clutch heat generation rate q, and a clutch slipping time Δt.

[Mathematical Formula 1]

$$Q = \int R(t) \times q \times \Delta t \tag{1}$$

Clutch heat generation rate q can be calculated by the following equation (2).

Clutch heat generation rate $q$=friction coefficient× relative rotation speed×clutch hydraulic pressure (2)

In the equation (1), clutch slipping time Δt is time during which forward clutch 55 is in the semi-engagement state according to operation amount P of brake pedal 75. When forward clutch 55 is completely engaged or disengaged, clutch slipping time Δt returns to zero.

In the equation (2), the friction coefficient is a friction coefficient of a friction material of the clutch plate. The relative rotation speed is a difference between engine rotation speed Ne detected by the engine rotation speed sensor and pump impeller rotation speed Nc detected by the torque converter input rotation speed sensor. The relative rotation speed is a difference in rotation speed between the input side and the output side. The clutch hydraulic pressure is a surface pressure generated between clutch plates. The electronic control type proportional solenoid valve is used for the forward and reverse clutch control valves 34, 35, so that the clutch hydraulic pressure can be read from the clutch hydraulic pressure instruction signal transmitted from controller 30 to forward and reverse clutch control valves 34, 35.

Controller 30 determines whether calorific value Q is less than a threshold Qmax. When the calorific value Q is greater than or equal to Qmax, controller 30 stops the clutch hydraulic pressure control in which forward clutch 55 is brought into the semi-engagement state by controlling the hydraulic pressure of forward clutch 55. Consequently, calorific value Q of forward clutch 55 can be reduced.

Alternatively, controller 30 may generate a control signal in order to cause an output device (a display apparatus or a speaker) to issue a predetermined notification for stopping the clutch hydraulic pressure control. According to this configuration, controller 30 can give the operator a trigger for reducing calorific value Q of forward clutch 55.

(g5. Detection of Excessive Slippage)

In the case where a rotation speed difference between the front and rear shafts of forward clutch 55 becomes greater than or equal to a predetermined threshold in the semi-engagement state of forward clutch 55, controller 30 stops the clutch hydraulic pressure control in which the hydraulic pressure of forward clutch 55 is set to setting value Fs as illustrated in FIG. 4(E). Consequently, the hydraulic pressure of forward clutch 55 is increased when large slippage in which the rotation speed difference between the front and rear shafts of forward clutch 55 is greater than or equal to the predetermined threshold is detected. Thus, the slippage of forward clutch 55 is reduced.

In particular, the large slippage as described above can be generated immediately after the shift from the loading reverse to the dump approach (immediately after time t2 in FIG. 4). Consequently, when the large slippage is generated, shock felt by the shock operator can be reduced by stopping the clutch hydraulic pressure control.

(g6. Start Condition of Clutch Hydraulic Pressure Control)

Controller 30 may be configured to perform the clutch hydraulic pressure control in which forward clutch 55 is brought into the semi-engagement state by controlling the hydraulic pressure of the hydraulic oil supplied to forward clutch 55 on condition that wheel loader 1 advances while raising boom 106 in the loaded state (during the dump approach) and that bucket 107 holds the load, such as the soil, which has a predetermined weight or more. For example, controller 30 can determine whether bucket 107 holds the load of the soil or the like having the predetermined weight or more based on whether a bottom pressure (hydraulic pressure) of lift cylinders 114a, 114b is greater than or equal to a predetermined value.

H. APPENDIX

The wheel loader includes the boom, the forward or speed stage clutch, and the controller that controls the hydraulic pressure of hydraulic oil supplied to the clutch. The controller performs clutch hydraulic pressure control for bringing the clutch into a semi-engagement state by controlling the hydraulic pressure of the hydraulic oil supplied to the clutch on condition that the wheel loader advances while raising the boom in at least a loaded state.

According to the above configuration, the dragging degree of the brake can be reduced. As a result, in the wheel loader, the wear of the brake pad of the service brake can be reduced, and the fuel consumption of the wheel loader can also be reduced. In particular, even if the distance between the wheel loader and the approaching object such as the dump truck is insufficient, the necessity of the brake operation is eliminated except for the brake operation immediately before the approaching object. Consequently, the wear of the brake pad can be reduced, and the fuel consumption of the wheel loader can be reduced. The simultaneous operation of the accelerator pedal and the brake pedal is eliminated, so that the operator's operation is simplified. As described above, according to the wheel loader, the operation efficiency can be improved.

Preferably, in the clutch hydraulic pressure control, the controller controls the hydraulic pressure of the hydraulic oil supplied to the clutch such that the hydraulic pressure is maintained at a constant value.

According to the above configuration, the operator can finely adjust the forward speed of the wheel loader as compared with the configuration in which the hydraulic pressure of the clutch is not maintained at the constant value.

Preferably, the wheel loader further includes a setting device that receives the operator's operation to set the constant value.

According to the above configuration, the operator can change the forward speed of the wheel loader to the desired setting in the case where the wheel loader advances and approaches the approaching object.

Preferably, the wheel loader further includes the distance measuring sensor. The distance measuring sensor measures the distance between the wheel loader and the approaching object when the wheel loader advances and approaches the approaching object. In the clutch hydraulic pressure control, the controller controls the hydraulic pressure of the hydraulic oil supplied to the clutch based on the distance measured by the distance measuring sensor.

According to the above configuration, the hydraulic pressure of the clutch is reduced as the distance between the wheel loader and the approaching object shortens, so that the vehicle speed of the wheel loader can be reduced as the wheel loader approaches the approaching object.

Preferably, the controller sets the hydraulic pressure of the hydraulic oil supplied to the clutch to the first hydraulic pressure when the distance is the first distance, and sets the hydraulic pressure of the hydraulic oil supplied to the clutch to the second hydraulic pressure lower than the first hydraulic pressure when the distance is the second distance shorter than the first distance.

According to the above configuration, the vehicle speed of the wheel loader can be reduced as the wheel loader approaches the approaching object.

Preferably the wheel loader further includes the boom control lever that operates the boom. The controller performs the clutch hydraulic pressure control on condition that the wheel loader advances and approaches the approaching object at a predetermined speed stage and that the boom control lever receives the boom-raising operation.

According to the above configuration, the operation efficiency can be improved during the dump approach.

Preferably, when the wheel loader ends the advance for approaching the approaching object, the controller controls the hydraulic pressure of the hydraulic oil supplied to the clutch such that the hydraulic pressure of the hydraulic oil supplied to the clutch becomes the hydraulic pressure before the start of the clutch hydraulic pressure control.

According to the above configuration, when the wheel loader ends the advance for approaching the approaching object, the hydraulic pressure of the clutch can be returned to the value before the start of the clutch hydraulic pressure control.

Preferably, the wheel loader further includes the vehicular body and the inclination sensor that detects the inclination of the vehicular body. The controller performs the clutch hydraulic pressure control on condition that the inclination of the vehicular body is less than the predetermined angle.

According to the above configuration, the increase in thermal load can be reduced in the sloping ground.

Preferably, the controller calculates the calorific value of the clutch while performing the clutch hydraulic pressure control. The controller performs at least one of the predetermined notification processing and the stop of the clutch hydraulic pressure control when the calculated calorific value is greater than or equal to the predetermined first threshold.

According to the above configuration, the calorific value of the clutch can be reduced.

Preferably, the controller stops the clutch hydraulic pressure control when the rotation speed difference between the front and rear shafts of the clutch becomes greater than or equal to the second threshold value in the semi-engagement state of the clutch.

According to the above configuration, when the large slippage is generated in the clutch, the shock felt by the operator can be reduced by stopping the clutch hydraulic pressure control.

Preferably, the wheel loader further includes the first rotation speed sensor that detects the rotation speed of the input shaft of the transmission including the clutch and the second rotation speed sensor that detects the rotation speed of the output shaft of the transmission. Based on the detection value of the first rotation speed sensor and the detection value of the second rotation speed sensor, the controller determines whether the clutch is in the semi-engagement state or the complete engagement state.

According to the above configuration, whether the clutch is in the semi-engagement state or the complete engagement state can be determined.

Preferably, the controller estimates the rotation speed of the output shaft from the detection value of the first rotation speed sensor. The controller calculates the difference between the estimated rotation speed and the detection value of the second rotation speed sensor. When the calculated difference becomes the third threshold, the controller determines that the clutch becomes the semi-engagement state.

According to the above configuration, the determination that the clutch is in the semi-engagement state can be made.

The wheel loader includes the boom, the power train including the plurality of clutches, the controller that controls the hydraulic pressure of hydraulic oil supplied to each of the plurality of clutches of the power train, and the distance measuring sensor that measures the distance between the wheel loader and the approaching object. On condition that the wheel loader advances and approaches the approaching object while raising the boom in the loaded state, the controller performs the clutch hydraulic pressure control in which the predetermined clutch is brought into the semi-engagement state by controlling the hydraulic pressure of the hydraulic oil supplied to the predetermined clutch among the plurality of clutches. In the clutch hydraulic pressure control, the controller controls the hydraulic pressure of the hydraulic oil supplied to the predetermined clutch based on the distance measured by the distance measuring sensor.

According to the above configuration, the dragging degree of the brake can be reduced. As a result, in the wheel loader, the wear of the brake pad of the service brake can be reduced, and the fuel consumption of the wheel loader can also be reduced. In particular, even if the distance between the wheel loader and the approaching object such as the dump truck is insufficient, the necessity of the brake operation is eliminated except for the brake operation immediately before the dump truck. Consequently, the wear of the brake pad can be reduced, and the fuel consumption of the wheel loader can be reduced. The simultaneous operation of the accelerator pedal and the brake pedal is eliminated, so that the operator's operation is simplified. As described above, according to the wheel loader, the operation efficiency can be improved.

The hydraulic pressure of the clutch is reduced as the distance between the wheel loader and the approaching object shortens, so that the vehicle speed of the wheel loader can be reduced as the wheel loader approaches the approaching object.

Preferably, the approaching object is the dump truck.

According to the above configuration, the operation efficiency can be improved during the dump approach.

Preferably, the wheel loader further includes the bucket connected to the boom. The controller determines the loaded state when the bucket is in the tilted state.

According to the above configuration, the controller can determine whether the wheel loader is in the loaded state.

Preferably, the wheel loader further includes the boom cylinder that drives the boom. When the hydraulic pressure on the bottom side of the boom cylinder is greater than or equal to a predetermined value, the controller determines that the wheel loader is in the loaded state.

According to the above configuration, the controller can more accurately determine whether the wheel loader is in the loaded state as compared with the configuration that determines whether the wheel loader is in the loaded state only on condition that the bucket is in the tilted state.

A method for controlling a wheel loader includes the steps of determining whether the wheel loader advances while raising the boom in the loaded state and bringing the predetermined clutch into the semi-engagement state by controlling the hydraulic pressure of the hydraulic oil supplied to the predetermined clutch included in the power train when the determination is made that the wheel loader advances while raising the boom in the loaded state.

According to the above configuration, the dragging degree of the brake can be reduced. As a result, in the wheel loader, the wear of the brake pad of the service brake can be reduced, and the fuel consumption of the wheel loader can also be reduced. In particular, even if the distance between the wheel loader and the dump truck is insufficient, necessity of the brake operation is eliminated except for the brake operation immediately before the dump truck. Consequently, the wear of the brake pad can be reduced, and the fuel consumption of the wheel loader can be reduced. The simultaneous operation of the accelerator pedal and the brake pedal is eliminated, so that the operator's operation is simplified. As described above, according to the wheel loader, the operation efficiency can be improved.

The above embodiments are only by way of example, and the present invention is not limited to the above embodiment. The scope of the present invention is indicated by the claims, and it is intended that all modifications within the meaning and scope of the claims are included in the present invention.

REFERENCE SIGNS LIST 1, 1A: wheel loader, 2: engine, 3: torque converter, 4: transmission, 6: transfer, 7: pressure sensor, 8: hydraulic pump, 11: pump impeller, 12: turbine runner, 13: stator, 14: lock-up clutch, 15: one-way clutch, 28: electronic control type fuel injector, 29: engine rotation speed sensor, 30: controller, 31: accelerator pedal, 32: accelerator operation amount sensor, 34, 35: forward and reverse clutch control valve, 36, 39: speed change clutch control valve, 40: service brake, 41a, 41b: hydraulic actuator, 42a, 42b: operation valve, 43: parking brake, 44: torque converter input rotation speed sensor, 45: transmission input shaft rotation speed sensor, 47: transmission output shaft rotation speed sensor, 48: brake control valve, 51 to 54: speed stage clutch, 55: forward clutch, 56: reverse clutch, 71a: boom control lever, 71b: boom operation detector, 72a: bucket control lever, 72b: bucket operation detector, 73a: forward and reverse switching lever, 73b: forward and reverse switching detector, 74a: speed change lever, 74b: speed change detector, 75: brake pedal, 76: brake operation amount sensor, 81: monitor, 90: driving force transmission path, 102: vehicular body, 102a: front vehicular body unit, 102b: rear vehicular body unit, 103: work implement, 104a: front wheel, 104b: rear wheel, 105: operator's cab, 106: boom, 107: bucket, 109: bell crank, 111a, 111b: steering cylinder, 114a, 114b: lift cylinder, 115: tilt cylinder, 116: boom pin, 117: bucket pin, 144: angle sensor, 149: distance measuring sensor, 900: dump truck

The invention claimed is:

1. A wheel loader comprising:
a boom;
a forward or speed stage clutch;
a controller configured to control hydraulic pressure of hydraulic oil supplied to the clutch; and
a distance measuring sensor,
wherein the controller performs clutch hydraulic pressure control in which the clutch is brought into a semi-engagement state by controlling the hydraulic pressure of the hydraulic oil supplied to the clutch on condition that the wheel loader advances while raising the boom in a loaded state,
wherein the distance measuring sensor measures a distance between the wheel loader and an approaching object when the wheel loader advances and approaches the approaching object, and
in performing the clutch hydraulic pressure control, the controller controls the hydraulic pressure of the hydraulic oil supplied to the clutch based on the distance measured by the distance measuring sensor.

2. The wheel loader according to claim 1, wherein the controller
sets the hydraulic pressure of the hydraulic oil supplied to the clutch to a first hydraulic pressure when the distance is a first distance, and
sets the hydraulic pressure of the hydraulic oil supplied to the clutch to a second hydraulic pressure lower than the first hydraulic pressure when the distance is a second distance shorter than the first distance.

3. A wheel loader according to claim 1, comprising:
a boom;
a transmission including a forward or speed stage clutch; and
a controller configured to control hydraulic pressure of hydraulic oil supplied to the clutch,
wherein the controller performs clutch hydraulic pressure control in which the clutch is brought into a semi-engagement state by controlling the hydraulic pressure of the hydraulic oil supplied to the clutch on condition that the wheel loader advances while raising the boom in a loaded state,
wherein in the semi-engagement state, the controller controls the hydraulic pressure of the hydraulic oil supplied to the clutch to be maintained at a constant value, and
wherein the controller
calculates a calorific value of the clutch when the clutch hydraulic pressure control is being performed, and
performs at least one of (i) predetermined notification processing and (ii) the stop of clutch hydraulic pressure control when the calculated calorific value is greater than or equal to a predetermined first threshold.

4. A wheel loader according to claim 1, comprising:
a boom;
a transmission including a forward or speed stage clutch; and
a controller configured to control hydraulic pressure of hydraulic oil supplied to the clutch,
wherein the controller performs clutch hydraulic pressure control in which the clutch is brought into a semi-engagement state by controlling the hydraulic pressure of the hydraulic oil supplied to the clutch on condition that the wheel loader advances while raising the boom in a loaded state,
wherein in the semi-engagement state, the controller controls the hydraulic pressure of the hydraulic oil supplied to the clutch to be maintained at a constant value, and
wherein the controller stops the clutch hydraulic pressure control when a rotation speed difference between front and rear shafts of the clutch becomes greater than or equal to a second threshold in the semi-engagement state of the clutch.

5. A wheel loader according to claim 1, further comprising:
a boom;
a transmission including a forward or speed stage clutch;
a controller configured to control hydraulic pressure of hydraulic oil supplied to the clutch,
a first rotation speed sensor configured to detect a rotation speed of an input shaft of the transmission including the clutch; and
a second rotation speed sensor configured to detect a rotation speed of an output shaft of the transmission,
wherein the controller performs clutch hydraulic pressure control in which the clutch is brought into a semi-engagement state by controlling the hydraulic pressure of the hydraulic oil supplied to the clutch on condition that the wheel loader advances while raising the boom in a loaded state,
wherein in the semi-engagement state, the controller controls the hydraulic pressure of the hydraulic oil supplied to the clutch to be maintained at a constant value, and
wherein the controller determines whether the clutch is in the semi-engagement state or a complete engagement state based on a detection value of the first rotation speed sensor and a detection value of the second rotation speed sensor.

6. A wheel loader comprising:
a boom;
a power train including a plurality of clutches;
a controller configured to control hydraulic pressure of hydraulic oil supplied to each of the plurality of clutches of the power train; and
a distance measuring sensor configured to measure a distance between the wheel loader and an approaching object,
wherein the controller
performs clutch hydraulic pressure control in which a predetermined clutch among the plurality of clutches is brought into a semi-engagement state by controlling the hydraulic pressure of the hydraulic oil supplied to the predetermined clutch on condition that the wheel loader advances and approaches the approaching object while raising the boom in a loaded state, and controls the hydraulic pressure of the hydraulic oil supplied to the predetermined clutch based on the distance measured by the distance measuring sensor in the clutch hydraulic pressure control.

7. The wheel loader according to claim 1, wherein the approaching object is a dump truck.

8. The wheel loader according to claim 6, further comprising a bucket connected to the boom, wherein the controller determines the loaded state when the bucket is in a tilted state.

9. The wheel loader according to claim 8, further comprising a boom cylinder configured to drive the boom, wherein the controller determines the loaded state when the hydraulic pressure on a bottom side of the boom cylinder is greater than or equal to a predetermined value.

* * * * *